US011148188B2

(12) United States Patent
Simpson et al.

(10) Patent No.: US 11,148,188 B2
(45) Date of Patent: Oct. 19, 2021

(54) TOOL AND ASSOCIATED METHOD FOR INSTALLING A BLIND FASTENER

(71) Applicant: The Boeing Company, Chicago, IL (US)

(72) Inventors: Blake A. Simpson, Kent, WA (US); David G. Ellsworth, Kent, WA (US); Casey M. Cowell, Kenmore, WA (US); Stephen G. Holley, Gig Harbor, WA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 16/665,223

(22) Filed: Oct. 28, 2019

(65) Prior Publication Data
US 2021/0121939 A1    Apr. 29, 2021

(51) Int. Cl.
*B21J 15/04* (2006.01)
*B21J 15/10* (2006.01)
*F16B 19/10* (2006.01)
*B21J 15/14* (2006.01)

(52) U.S. Cl.
CPC ........... *B21J 15/043* (2013.01); *B21J 15/105* (2013.01); *B21J 15/142* (2013.01); *F16B 19/1072* (2013.01)

(58) Field of Classification Search
CPC ...... B21J 15/043; B21J 15/105; B21J 15/142; F16B 19/1072
USPC ......... 411/34, 36, 37, 38, 39, 40, 41, 42, 43, 411/44, 54, 55, 69, 70, 361
See application file for complete search history.

(56) References Cited

U.S. PATENT DOCUMENTS

| 3,276,308 | A | * | 10/1966 | Bergere | ............. | F16B 19/1054 411/43 |
| 3,657,956 | A | * | 4/1972 | Bradley | ............. | F16B 19/1063 411/43 |
| 4,604,322 | A | * | 8/1986 | Reid | ...................... | C08J 7/0427 428/332 |
| 4,604,889 | A | * | 8/1986 | Sukharevsky | ......... | B21J 15/105 227/112 |
| 4,653,309 | A | | 3/1987 | Hendricks et al. | | |
| 4,885,836 | A | * | 12/1989 | Bonomi | ................... | B21J 15/10 29/524.1 |
| 5,802,691 | A | * | 9/1998 | Zoltaszek | ................ | B21J 15/26 222/390 |
| 5,816,761 | A | | 10/1998 | Cassatt et al. | | |
| 5,947,667 | A | | 9/1999 | Cassatt et al. | | |

(Continued)

*Primary Examiner* — Lawrence Averick
(74) *Attorney, Agent, or Firm* — Walters & Wasylyna LLC

(57) ABSTRACT

A tool for installing a blind fastener. The tool includes a retention member and a gripping member that defines a longitudinal axis and is moveable relative to the retention member along the longitudinal axis, the gripping member further defining a receiving cavity that is elongated along the longitudinal axis, an axial opening into the receiving cavity, and a radial opening into the receiving cavity. The tool also includes a contact element at least partially received in the radial opening and a locking collar moveable relative to the gripping member along the longitudinal axis between at least a first position and a second position. In the first position the locking collar engages the contact element and urges at least a portion of the contact element into the receiving cavity. In the second position the locking collar is disengaged from the contact element.

20 Claims, 16 Drawing Sheets

(56) References Cited

U.S. PATENT DOCUMENTS

| | | | |
|---|---|---|---|
| 6,684,470 B1* | 2/2004 | Joux | B25B 27/0014 |
| | | | 29/243.521 |
| 7,263,753 B2* | 9/2007 | El Dessouky | B21J 15/043 |
| | | | 29/243.521 |
| 8,640,322 B1* | 2/2014 | Nikkel | B21J 15/043 |
| | | | 29/524.1 |
| 10,232,428 B2 | 3/2019 | Gunther et al. | |
| 10,294,976 B2 | 5/2019 | Bickford et al. | |
| 10,774,863 B2* | 9/2020 | Simpson | C09D 1/00 |
| 2005/0278918 A1* | 12/2005 | El Dessouky | G09G 5/397 |
| | | | 29/243.521 |
| 2010/0296895 A1 | 11/2010 | Cassatt et al. | |
| 2014/0130335 A1 | 5/2014 | Bickford et al. | |
| 2015/0196951 A1* | 7/2015 | Bigot | F16B 19/1054 |
| | | | 29/525.06 |
| 2015/0337885 A1 | 11/2015 | Whitlock et al. | |
| 2019/0283109 A1* | 9/2019 | Leger | B21J 15/12 |
| 2019/0383319 A1* | 12/2019 | Simpson | C09D 5/32 |

\* cited by examiner

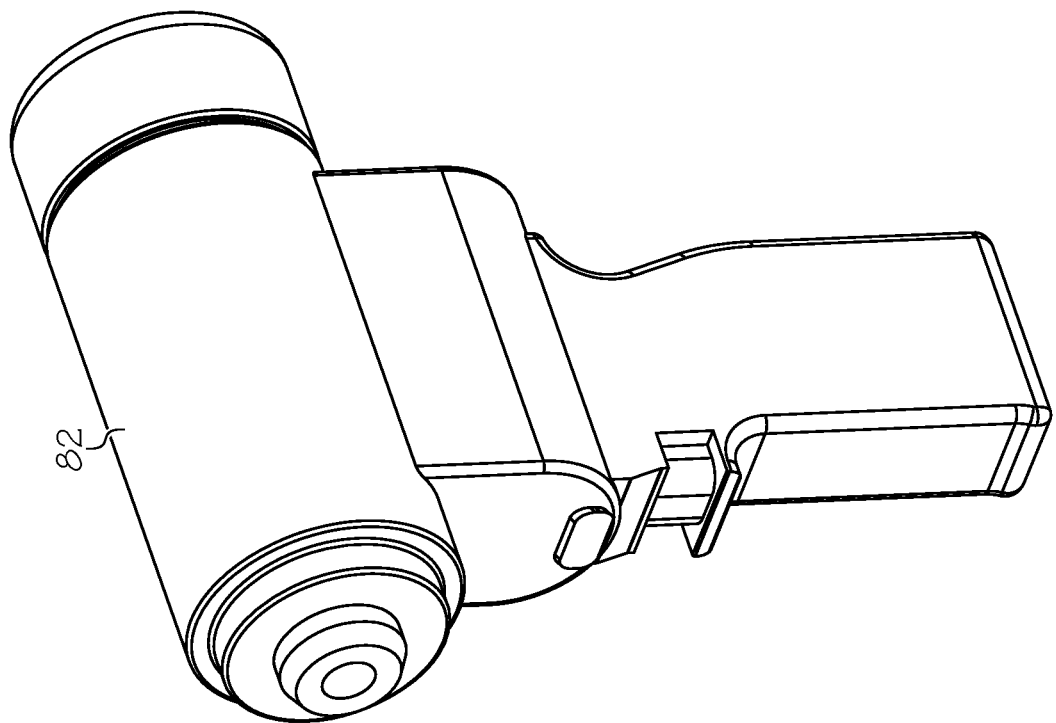
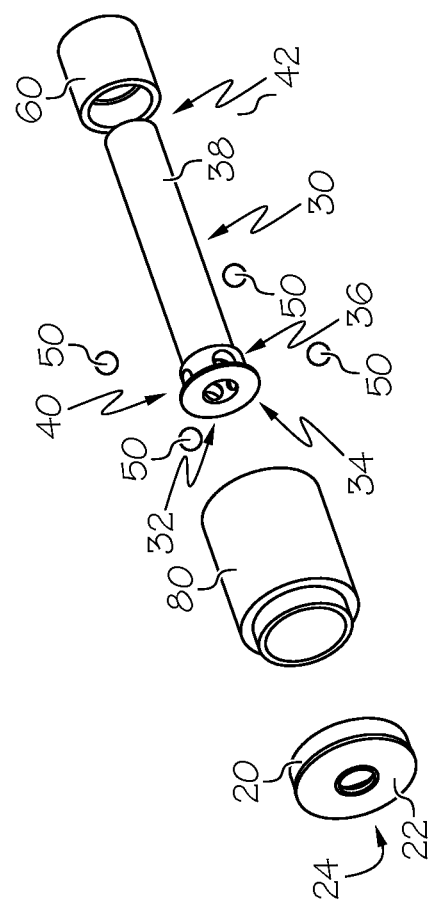
FIG. 8

TOOL AND ASSOCIATED METHOD FOR INSTALLING A BLIND FASTENER

FIELD

This application relates to tools and methods for installing blind fasteners, and, more particularly, to tools and methods for installing blind fasteners by gripping, axially translating, and rotating the blind fastener.

BACKGROUND

Mechanical fasteners are widely used for joining two or more components of a structural assembly. For example, mechanical fasteners are extensively used for joining the structural components of the airframe of an aircraft.

Blind fastener systems, also commonly known as one-sided-installation fasteners, are a particular type of mechanical fastener. Blind fastener systems include a core bolt and a sleeve, wherein both the core bolt and the sleeve are inserted into an appropriate bore in a structural assembly and engage the structural assembly from just one side of the structural assembly, without the need for accessing the opposite side of the structural assembly. Therefore, blind fastener systems are particularly suitable for use in applications where access to one side of a structural assembly is difficult or unavailable.

Current tooling and installation process for blind fastener systems are typically quite complex, difficult to manufacture, and challenging to integrate with robotics. These systems specifically struggle with installation at varying (non-normal) angles, installation where sealant is required (which may adhere to, and subsequently jam or plug the internal drive mechanism of the nose piece), and reducing cost.

Accordingly, those skilled in the art continue with research and development efforts in the field of blind fastener systems.

SUMMARY

Disclosed is a tool for installing a blind fastener, such as a blind fastener having a sleeve and a core bolt at least partially received within the sleeve.

In one example, the disclosed tool for installing a blind fastener includes a retention member and a gripping member that defines a longitudinal axis and is moveable relative to the retention member along the longitudinal axis (A), the gripping member further defining a receiving cavity that is elongated along the longitudinal axis, an axial opening into the receiving cavity, and a radial opening into the receiving cavity. The tool also includes a contact element at least partially received in the radial opening and a locking collar moveable relative to the gripping member along the longitudinal axis between at least a first position and a second position. In the first position the locking collar engages the contact element and urges at least a portion of the contact element into the receiving cavity. In the second position the locking collar is disengaged from the contact element.

In another example, the disclosed tool for installing a blind fastener includes a retention member that defines a distal surface and a through-opening that extends through the retention member from the distal surface. The tool also includes a gripping member that defines a longitudinal axis and is moveable relative to the retention member along the longitudinal axis, the gripping member further defining a receiving cavity that is elongated along the longitudinal axis, an axial opening into the receiving cavity, and a radial opening into the receiving cavity that is axially aligned with the through-opening of the retention member along the longitudinal axis. The tool further includes a contact element at least partially received in the radial opening, a torqueing element rotatable about the longitudinal axis, and a locking collar moveable relative to the gripping member along the longitudinal axis between at least a first position and a second position. In the first position the locking collar engages the contact element and urges at least a portion of the contact element into the receiving cavity. In the second position the locking collar is disengaged from the contact element.

Also disclosed is a method for installing a blind fastener, such as a blind fastener that includes a sleeve and a core bolt (having a bolt axis) at least partially received within the sleeve.

In one example, the disclosed method for installing a blind fastener includes steps of: (1) inserting the blind fastener into a bore in a structure; (2) retaining the sleeve relative to the bore; (3) gripping the core bolt by axially moving a locking collar into engagement with a contact element to urge the contact element radially inward into engagement with the core bolt; and (4) axially pulling the core bolt relative to the sleeve.

Other examples of the disclosed tools and associated methods will become apparent from the following detailed description, the accompanying drawings and the appended claims.

BRIEF DESCRIPTION OF THE DRAWINGS

FIG. 8 is an exploded perspective view of the tool of FIG. 1 being housed in a tool housing;

DETAILED DESCRIPTION

Figure 1:
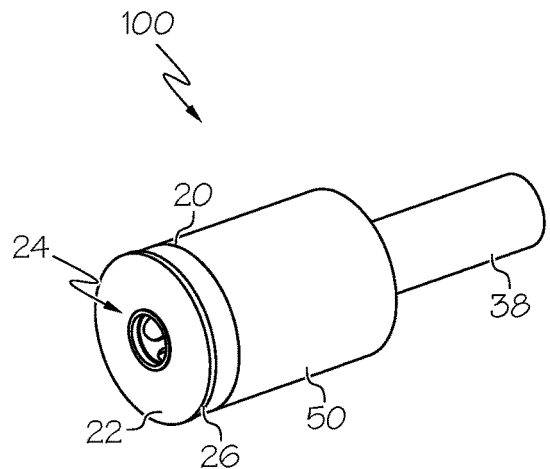
FIG. 1 is a perspective view of a tool for installing a blind fastener.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrase "an example" and similar language throughout the present disclosure may, but do not necessarily, refer to the same example. Further, the subject matter characterizing any one example may, but does not necessarily, include the subject matter characterizing any other example.

Figure 2:
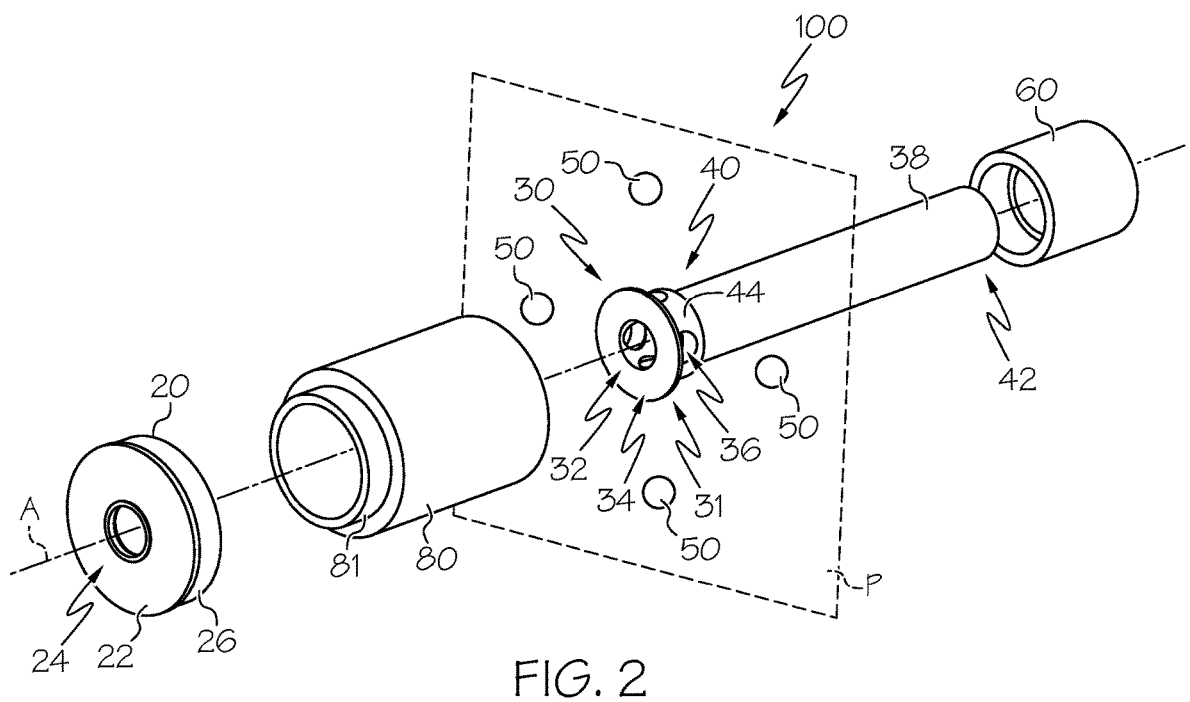
FIG. 2 is an exploded perspective view of the tool of FIG. 1.
Figure 3:
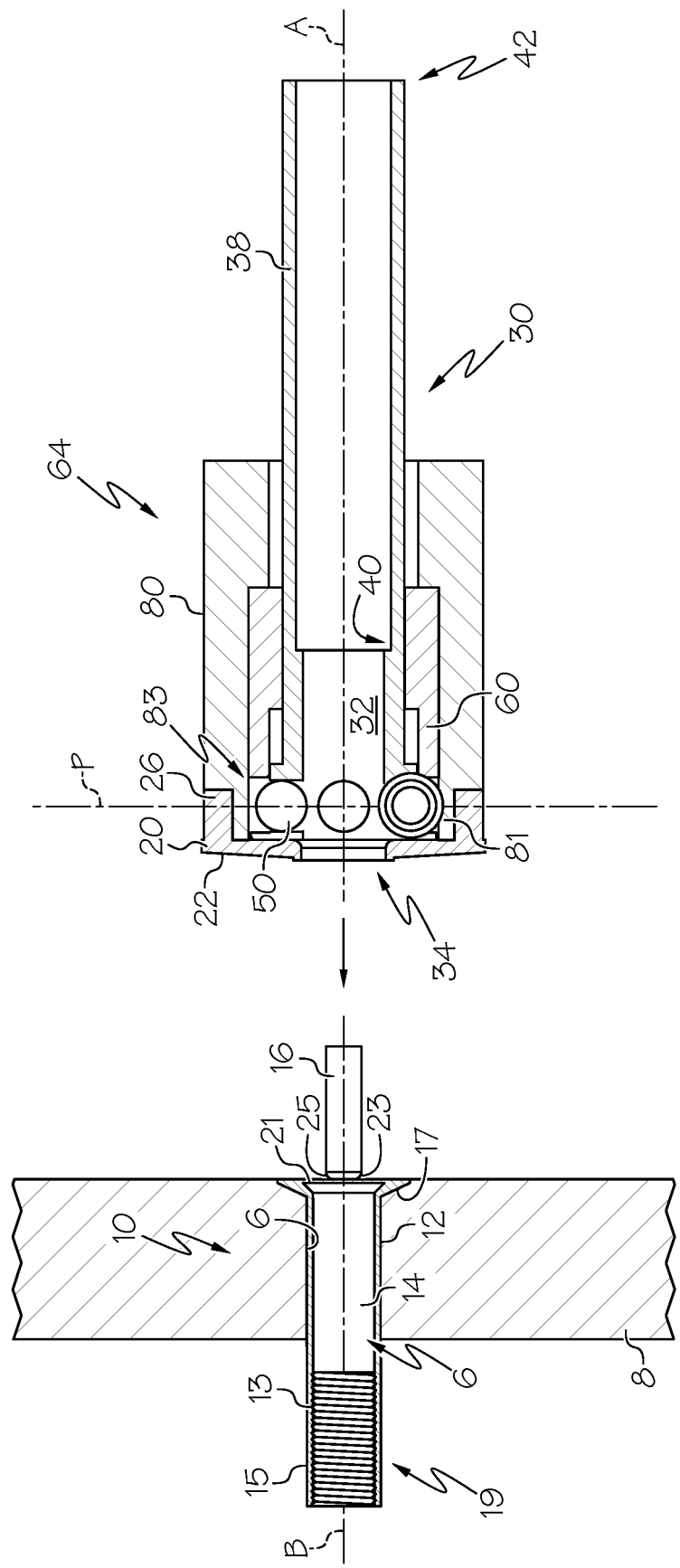
FIG. 3. is a side cross-sectional view of a blind fastener being inserted into the tool of FIG. 1.

Referring to FIGS. 1 and 2, the present disclosure provides examples of a tool 100 for installing a blind fastener 10. As shown in FIG. 3, the blind fastener 10 may generally include a sleeve 12 and a core bolt 14 at least partially received within the sleeve 12. The core bolt 14 may include external threads 15 that correspond with internal threads 13 on the sleeve 12. Further, the sleeve 12 may include a tapered rim 17 and a shaft portion 19. By inserting the blind fastener 10 into an appropriate bore 6 in a structure 8 and translating (e.g., pulling) the core bolt 14 relative to the sleeve 12, a portion 11 of the sleeve 12 may buckle against the structure 8, causing the tapered rim 17 and the buckled portion 11 of the sleeve 12 to clamp the structure 8 therebetween. The core bolt 14 may then be rotated about bolt axis B to drive the core bolt 14 into the sleeve 12, thereby tightening the blind fastener 10 and finishing the installation.

In one or more examples, the core bolt 14 may include a core bolt head 21 and a drive provision 16. The drive provision 16 may have a generally elongated shape and may protrude outwardly from the core bolt head 21. The tool 100 may grip the drive provision 16 in order to perform the installation. Further, the drive provision 16 may be configured to be frangible upon the application of tension preload in the blind fastener 10. For example, the driving provision 16 may include a break groove 23 at an interface 25 between the drive provision 16 and the core bolt head 21 (FIG. 3). The break groove 23 may provide a reduced cross-sectional area at the interface 25 relative to the cross-sectional area along a remainder of the drive provision 16.

Figure 5:
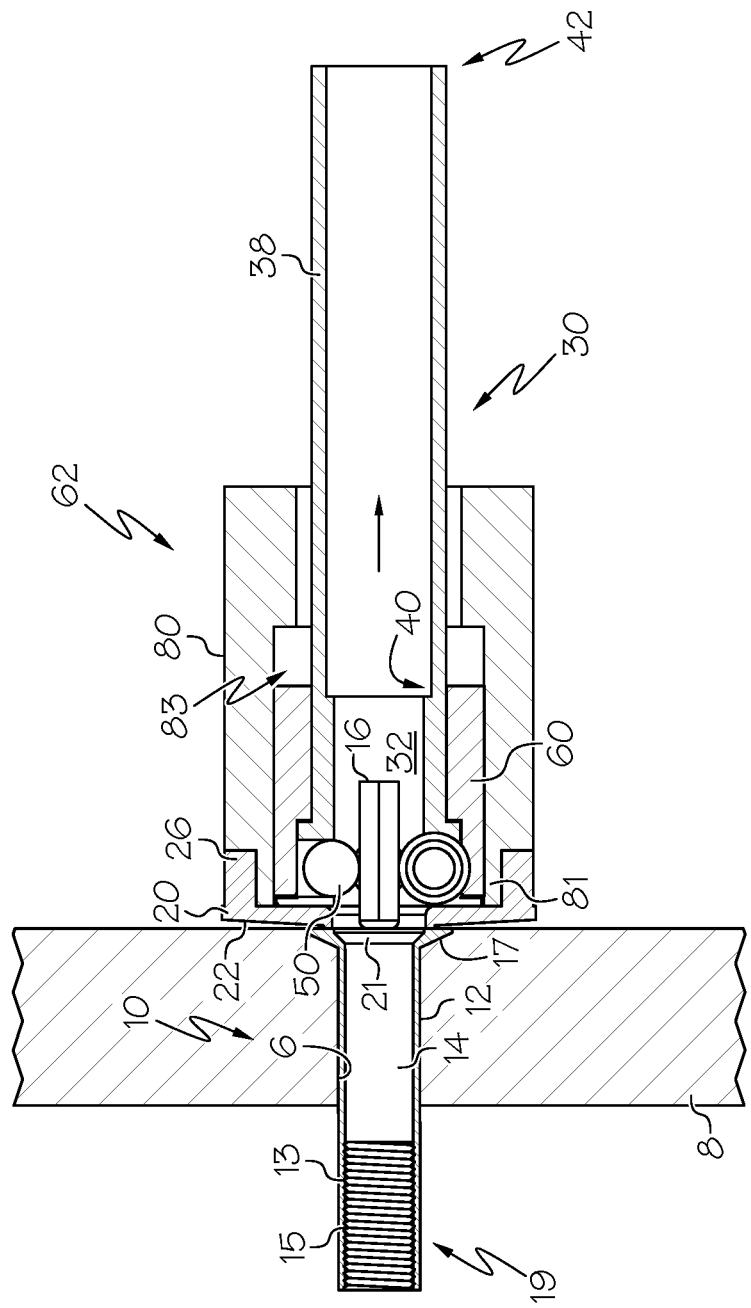
FIG. 5 is a side cross-sectional view of the tool of FIG. 1 axially translating a blind fastener.
Figure 6:
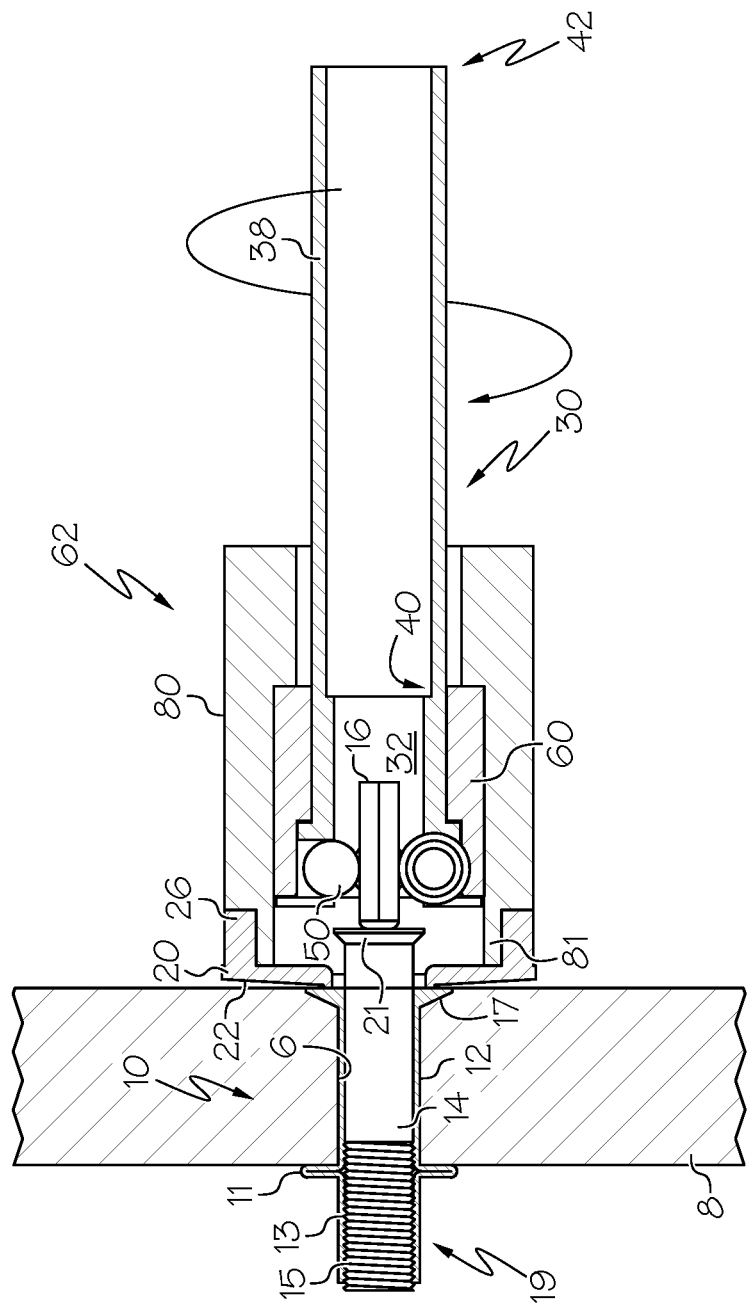
FIG. 6 is a side cross-sectional view of the tool of FIG. 1 rotating a blind fastener about longitudinal axis A.
Figure 7:
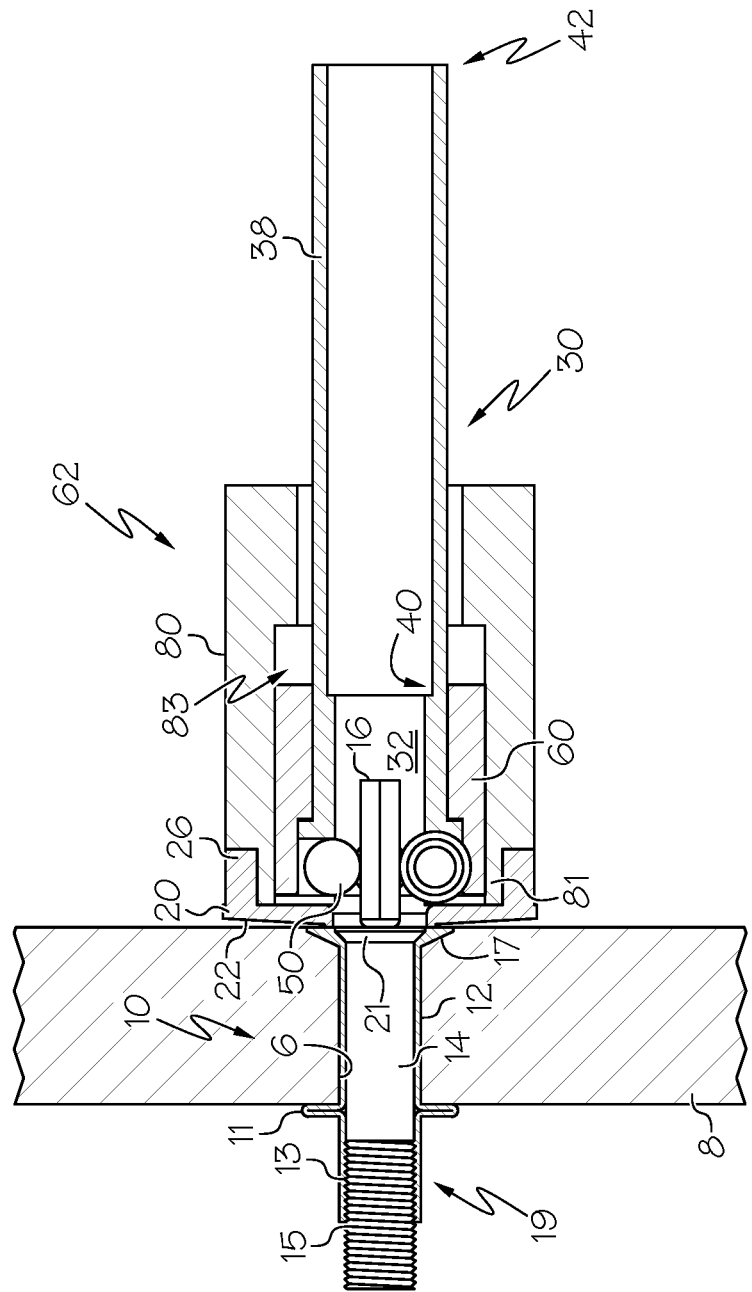
FIG. 7 is a side cross-sectional view of the tool of FIG. 1 having completed the installation of a blind fastener.

While maintaining the position of the sleeve 12 relative to the bore 6 in the structure 8, the tool 100 of the present disclosure performs the installation of the blind fastener 10 by gripping the core bolt 14 (FIGS. 3-5), axially translating the core bolt 14 along a longitudinal axis A relative to the sleeve 12 (FIGS. 5 and 6), and then rotating the core bolt 14 about the longitudinal axis A to drive the core bolt 14 into the sleeve 12 (FIGS. 6 and 7).

Referring specifically to FIG. 2, the tool 100 includes a retention member 20 and a gripping member 30 that defines a longitudinal axis A and is moveable relative to the retention member 20 along the longitudinal axis A. The gripping member 30 further defines a receiving cavity 32 that is elongated along the longitudinal axis A, an axial opening 34 into the receiving cavity 32, and a radial opening 36 into the receiving cavity 32. Further, the tool 100 also includes a contact element 50 at least partially received in the radial opening 36 (FIG. 3) and a locking collar 60 moveable relative to the gripping member 30 along the longitudinal axis A between at least a first position 62 and a second position 64. In the first position 62, the locking collar 60 engages the contact element 50 and urges at least a portion of the contact element 50 into the receiving cavity 32. In the second position 64, the locking collar 60 is disengaged from the contact element 50.

The retention member 20 may define a distal surface 22 and a through-opening 24 that extends through the retention member 20 from the distal surface 22. Once assembled, the retention member 20 may be axially aligned with the receiving cavity 32 of the gripping member 30 such that a drive provision 16 of a core bolt 14 may be inserted through the through-opening 24 of the retention member 20, through the axial opening 34 of the gripping member 30, and be received within the receiving cavity 32. When the core bolt 14 of the blind fastener 10 is inserted through the through-opening 24, the sleeve 12 of the blind fastener 10 abuts the distal surface 22 of the retention member 20.

The retention member 20 may be attached to the tool 100 by way of a fitting 26 connected to the distal surface 22 of the retention member 20. As shown, the tool 100 may include a tool sleeve 80 coaxially received over the gipping member 30. The tool sleeve 80 may also include a fitting 81 that corresponds to the retention member fitting 26. By urging the retention member 20 and the tool sleeve 80 together such that the retention member fitting 26 and the tool sleeve fitting 81 aligns, the retention member 20 and the tool sleeve 80 may be fixedly connected to one another, thereby attaching the retention member 20 to the tool 100.

The size and shape of the retention member through-opening 24, the axial opening 34 and the receiving cavity 32 may be varied as needed in accordance with the physical dimensions of the blind fastener 10. More specifically, the axial opening 34 and the receiving cavity 32 must be configured to permit the insertion and receipt of the drive provision 16 within the gripping member 30, and the through-opening 24 of the retention member 20 must be configured to contact only the sleeve 12 of the blind fastener 10. In this way, the retention member 20 may retain the position of the sleeve 12 within the bore 6 in the structure 8 while the core bolt 14 is axially translated relative to the sleeve 12.

Referring specifically to the examples depicted in FIGS. 2 and 3, the gripping member 30 may define a circumference 31 and a plurality of radial openings 36 about the circumference 31. As shown, the radial openings 36 may be spaced equidistantly about the circumference 31 of the gripping member 30 and may be aligned in a single plane P, wherein the single plane P is generally perpendicular to the longitudinal axis A. Each radial opening 36 may be circular in shape and sized accordingly to receive a contact element 50.

In FIGS. 2-8, the contact elements 50 are shown as being generally spherical in shape. As constructed, the contact elements 50 may include, for example, ball bearings. In other tool configurations, however, the contact elements 50 may have different shapes, including irregular shapes. For example, it is generally contemplated that contact elements 50 having capsule or polyhedral shapes may be employed without departing from the scope of the present disclosure. Capsule shaped contact elements 50 may be appropriate to grip blind fasteners 10 having relatively narrow core bolts 14 (because capsule shaped contact elements may reach further into the receiving cavity). At this point, those skilled in the art will appreciate that the size of the radial openings 36, the locations of the radial openings 36 relative to the gripping member 30, and the number of contact elements 50 included may depend largely on the size and shape of the contact elements 50 employed, and thus, may also vary without departing from the scope of the present disclosure.

The radial openings 36 of the gripping member 30 may include a radial opening depth D. Further, the contact element(s) 50 may include a radial thickness T. As shown, the radial thickness T may be greater than the radial opening depth D such that when positioned within the radial opening 36, the contact element 50 may protrude into the receiving cavity 32 and also into the space 83 between the gripping member 30 and the tool sleeve 80. Further, the diameter of the radial openings 36 may be larger than the radial thickness T of the contact elements 50 so as to permit the contact elements 50 a degree of movement perpendicular to the longitudinal axis A between the receiving cavity 32 and the space 83.

Figure 4:
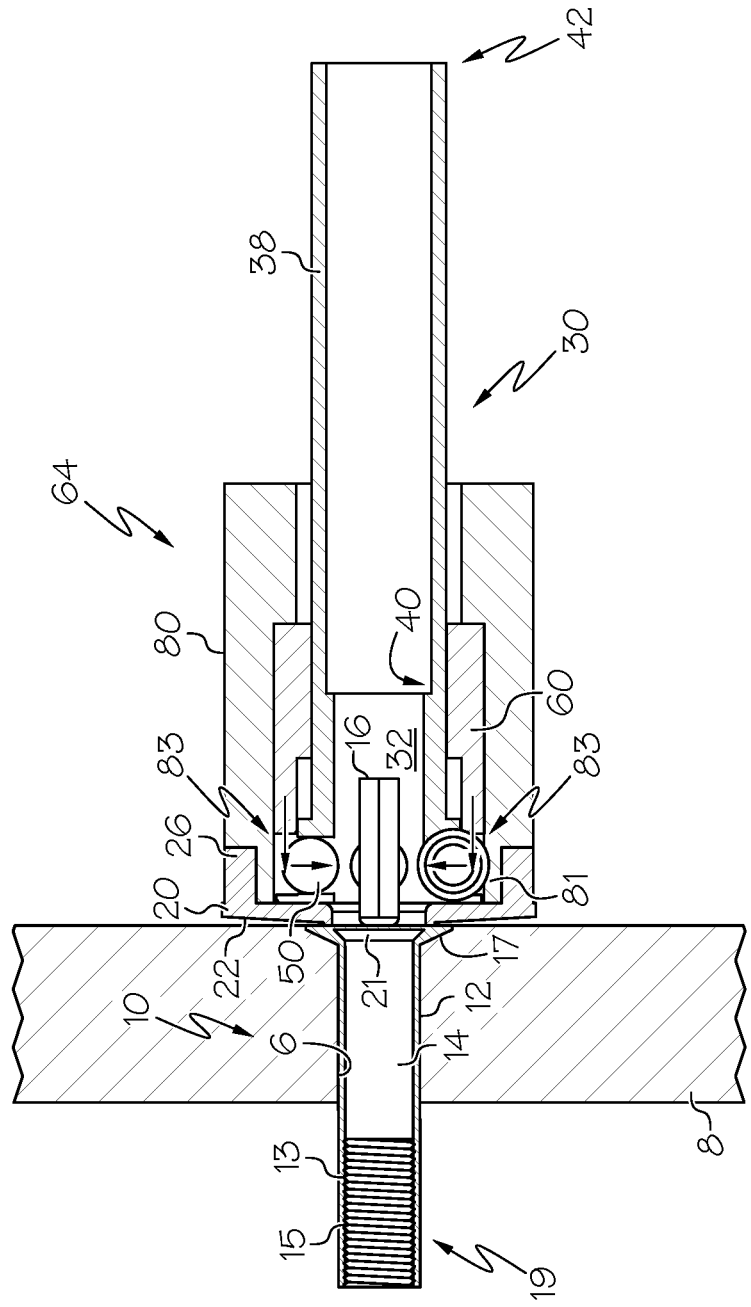
FIG. 4 is a side cross-sectional view of the tool of FIG. 1 gripping a blind fastener.

As illustrated, the locking collar 60 may be annular in shape and coaxially receivable over the gripping member 30. The locking collar 60 is moveable relative to the gripping member 30 between at least a first position 62 and a second position 64 in the space 83 between the gripping member 30 and the tool sleeve 80. Referring to FIG. 4, the locking collar 60 is shown to be disengaged from the contact elements 50 in the second position 64. In the second position 64, the contact elements 50 may move freely between the receiving cavity 32 and the space 83. Thus, the contact elements 50 may move radially outwards from the receiving cavity 32 to permit the insertion of driving provision 16 of a core bolt 14. Referring to FIG. 5, the locking collar 60 may be moved into the first position 62 once the driving provision 16 has been inserted. In doing so, the locking collar 60 may urge the contact elements 50 radially inwards toward the receiving cavity 32, thus gripping the driving provision 16 of the core bolt 14. Those skilled in the art will appreciate that there may also be a plurality of locking collar positions (e.g., a third, fourth, etc.) between the first position 62 and the second position 64 without departing from the scope of the present disclosure.

In one example, the gripping member 30 may define a circumference 44 and include a shaft 38 extending along the longitudinal axis A. The shaft 38 may include a distal end portion 40 and a proximal end portion 42 axially opposed from the distal end portion 40. The distal end portion 40 may include the receiving cavity 32, the axial opening 34 and the radial opening(s) 36. Those skilled in the art will appreciate that the locking collar 60 may be receivable over the shaft 38, and that the shaft 38 may constrain the movement of the locking collar 60 to only movement parallel to the longitudinal axis A. The first position 62 and the second position 64 of the locking collar 60 would thus be various points on the shaft 38 of the gripping member 30.

Figure 9:
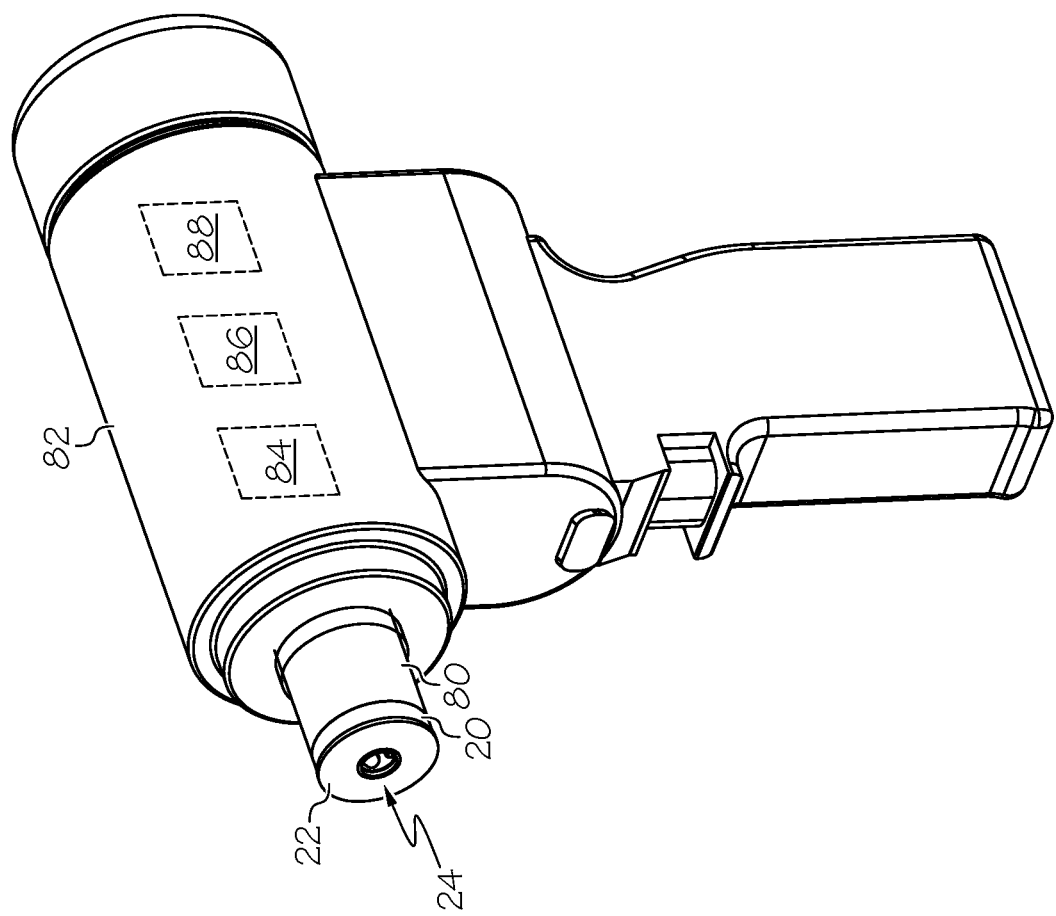
FIG. 9 is a side view of the tool of FIG. 8.

Once the locking collar 60 is in the first position 62 and the core bolt 14 is firmly gripped within the tool 100, the tool 100 may then axially translate the core bolt 14 relative to the sleeve 12 and then rotate the core bolt 14 about the longitudinal axis A to drive the core bolt 14 into the sleeve 12. Referring to FIGS. 8 and 9, the tool 100 may further include a tool housing 82 that houses the tool 100 as well as a number of actuators 84, 86, 88 for actuating the gripping, translating and rotating functions of the tool 100. In one example, the tool 100 may include a first actuator 84 operatively connected to the locking collar 60 and configured to axially move the locking collar 60 along the longitudinal axis A. In another example, the tool 100 may include a second actuator 86 operatively connected to the gripping member 30 and configured to axially move the gripping member 30 along the longitudinal axis A. In yet another example, the tool 100 may include a third actuator 88 operatively connected to the gripping member 30 and configured to rotate the gripping member 30 about the longitudinal axis A while the locking collar 60 is in the first position 62, thereby also rotating the core bolt 14. Those skilled in the art will appreciate that any suitable actuator 84, 86, 88 may be employed for these functions without departing from the scope of the present disclosure. As configured, suitable actuators 84, 86, 88 may include, for example, springs, hydraulic pistons, electric motors, and the like.

Figure 10:
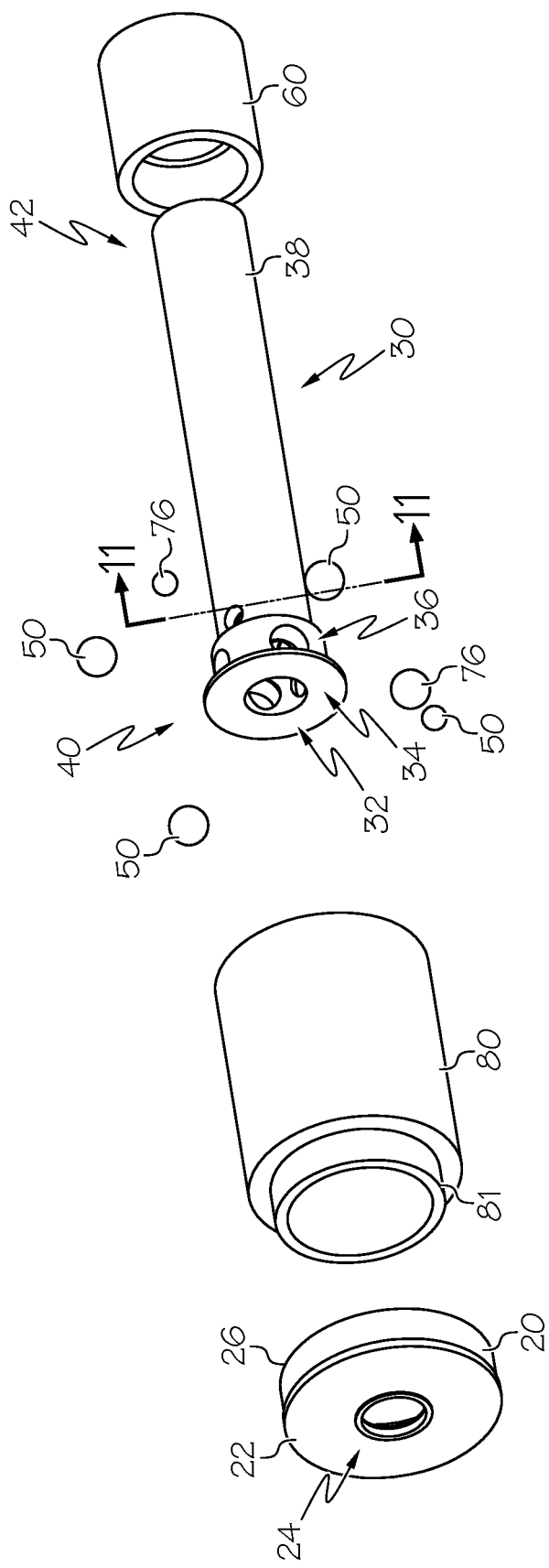
FIG. 10 is an exploded perspective view of a tool for installing a blind fastener that includes torqueing elements that are secondary contact elements.
Figure 11:
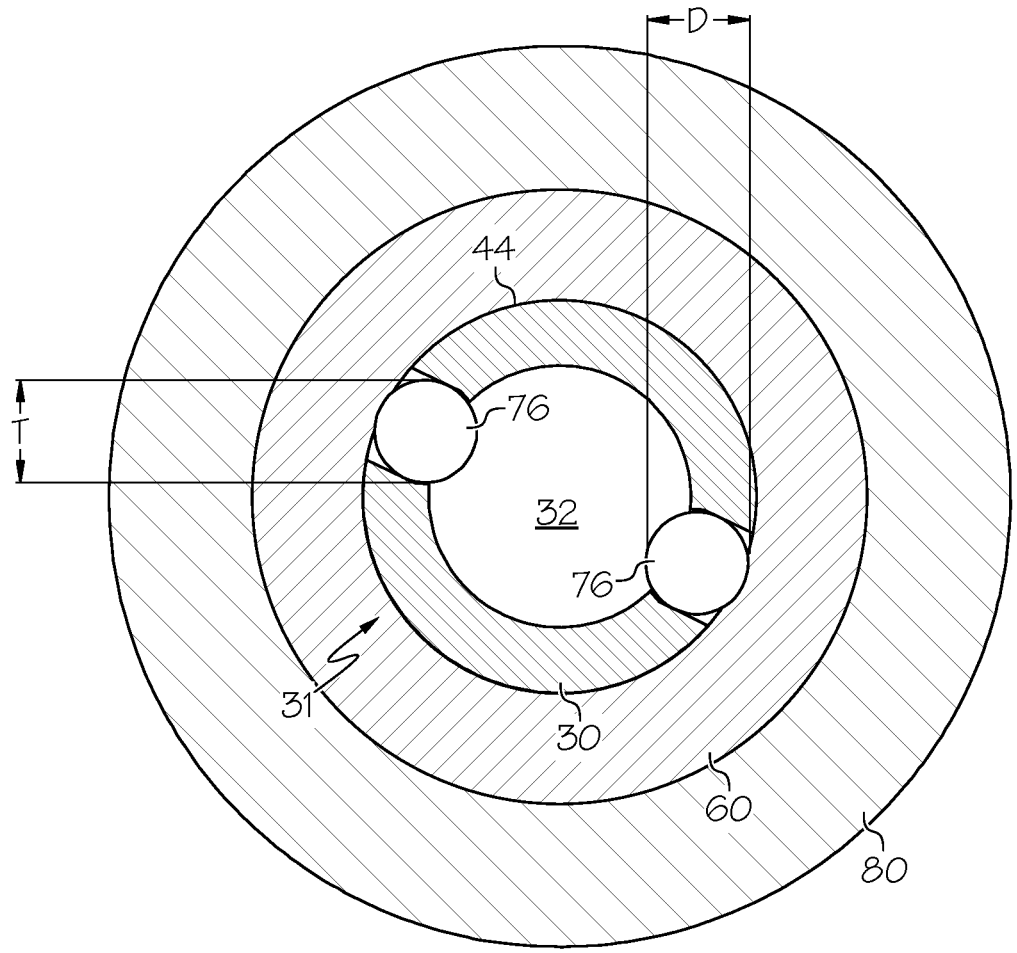
FIG. 11 is a front cross-sectional view of a portion of the tool of FIG. 10.
Figure 12:
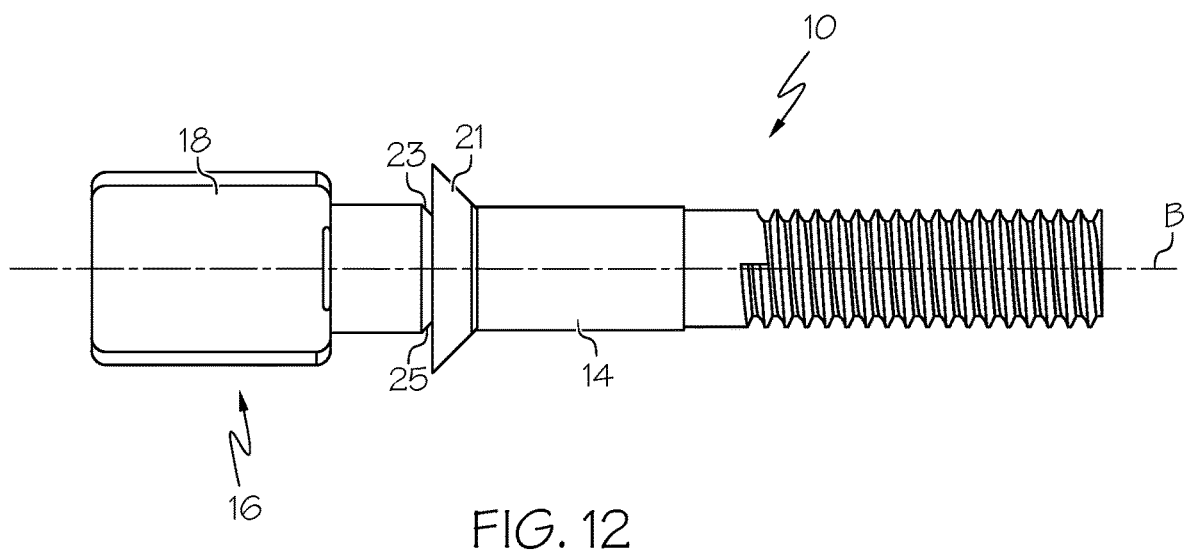
FIG. 12 is a side view of a core bolt that includes a drive provision that includes a truncated cylinder that includes laterally opposed truncations.
Figure 13:
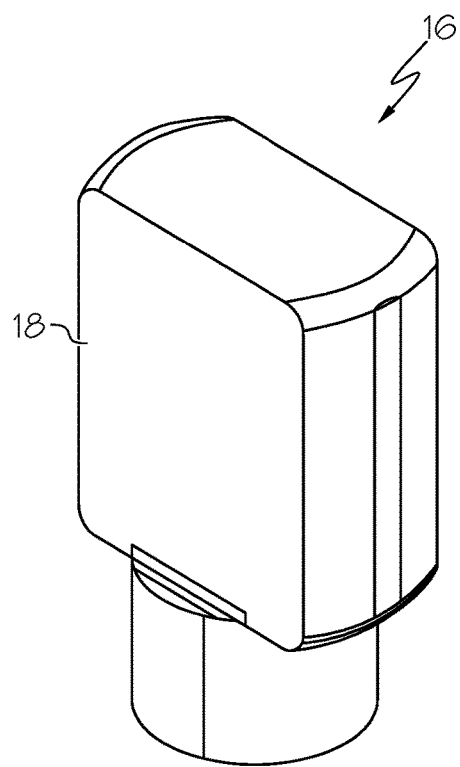
FIG. 13 is a perspective view of the drive provision of the core bolt of FIG. 12.

To facilitate the rotation of the core bolt 14, the tool 100 may include a torqueing element 70 rotatable about the longitudinal axis A. Further, the drive provision 16 of the core bolt 14 may be deliberately shaped to correspond with the torqueing element 70. Referring to FIGS. 10 and 11, the torqueing element 70 may include, for example, one or more secondary contact elements 76 (two being shown) axially displaced from the contact element 50 along the longitudinal axis A. Like the contact element 50, the secondary contact element(s) 76 may be spherical in shape (e.g., a ball bearing) and may be urged radially inward into the receiving cavity 32 by the locking collar 60 when the locking collar 60 is in the first position 62, and disengaged from the locking collar 60 when the locking collar 60 is in the second position 64. Referring to FIGS. 12 and 13, the secondary contact element(s) 76 may correspond with, for example, a driving provision 16 of a blind fastener 10 that includes a truncated cylinder that includes laterally opposed truncations 18. Upon inserting this drive provision 16 into the tool 100, the secondary contact elements 76 may engage the laterally opposed truncations 18 to align the core bolt 14 along the longitudinal axis A (e.g., the core bolt self-aligns).

Figure 14:
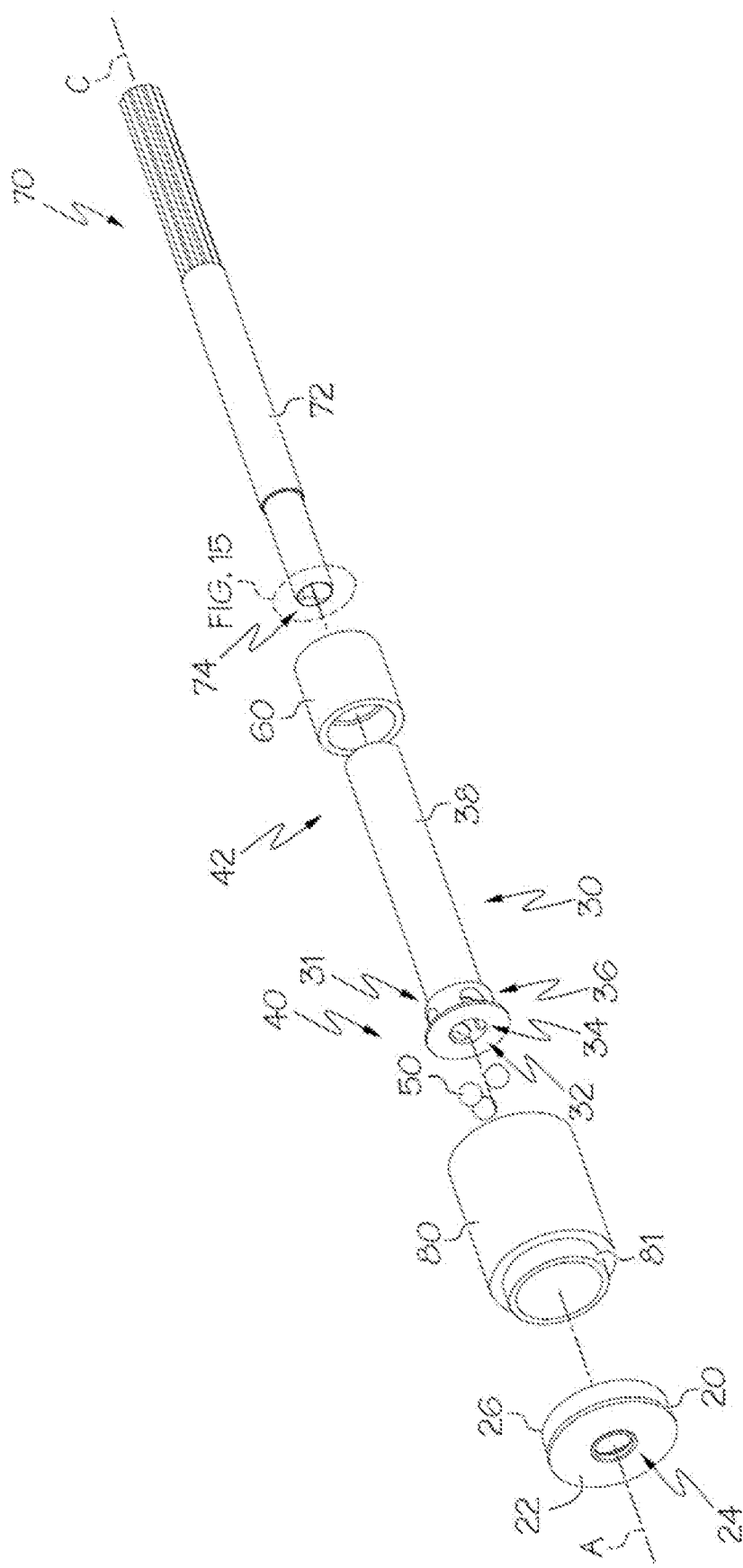
FIG. 14 is an exploded perspective view of a tool for installing a blind fastener that includes a torqueing element that is a socket member.
Figure 15:
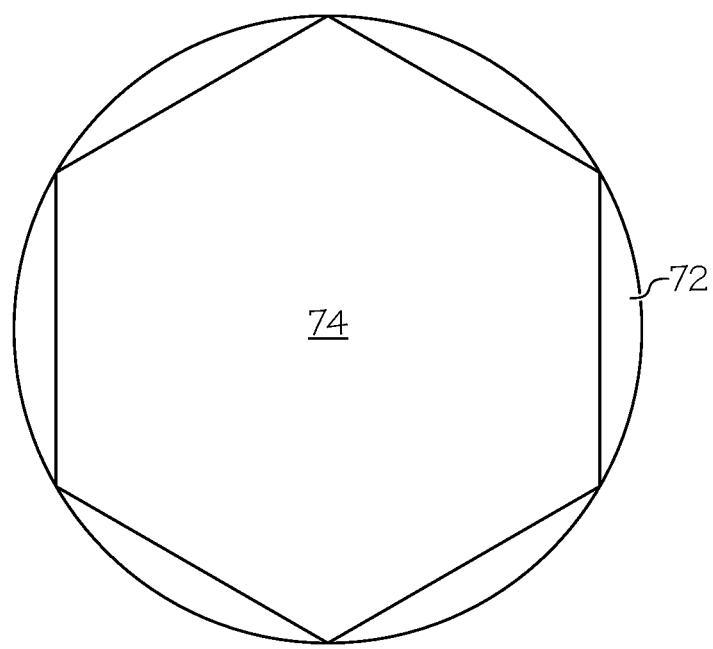
FIG. 15 is a front view of the socket member of the tool of FIG. 14.
Figure 16:
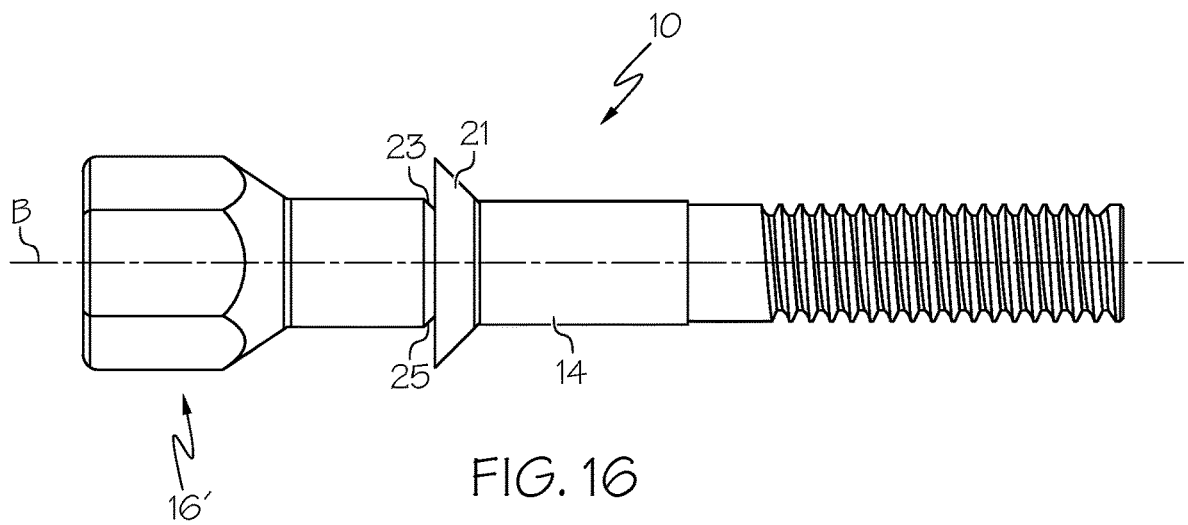
FIG. 16 is a side view of a core bolt containing a hex-shaped drive provision.
Figure 17:
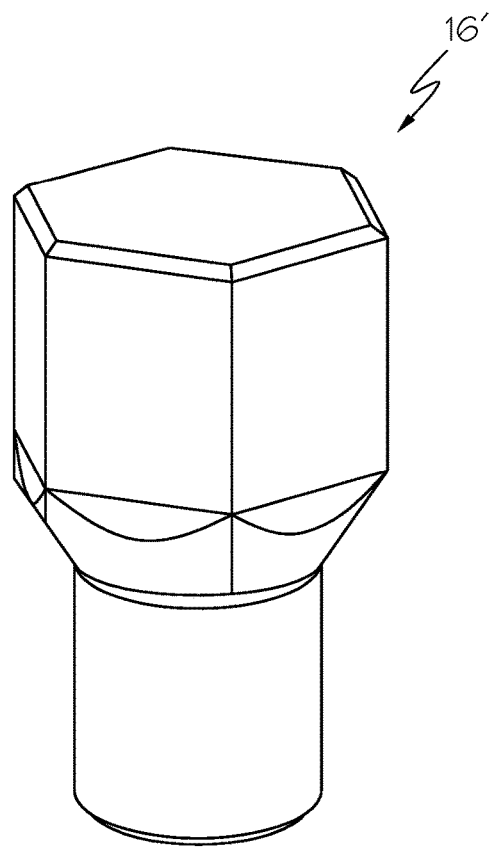
FIG. 17 is a perspective view of the hex-shaped drive provision of the core bolt of FIG. 16.
Figure 18:
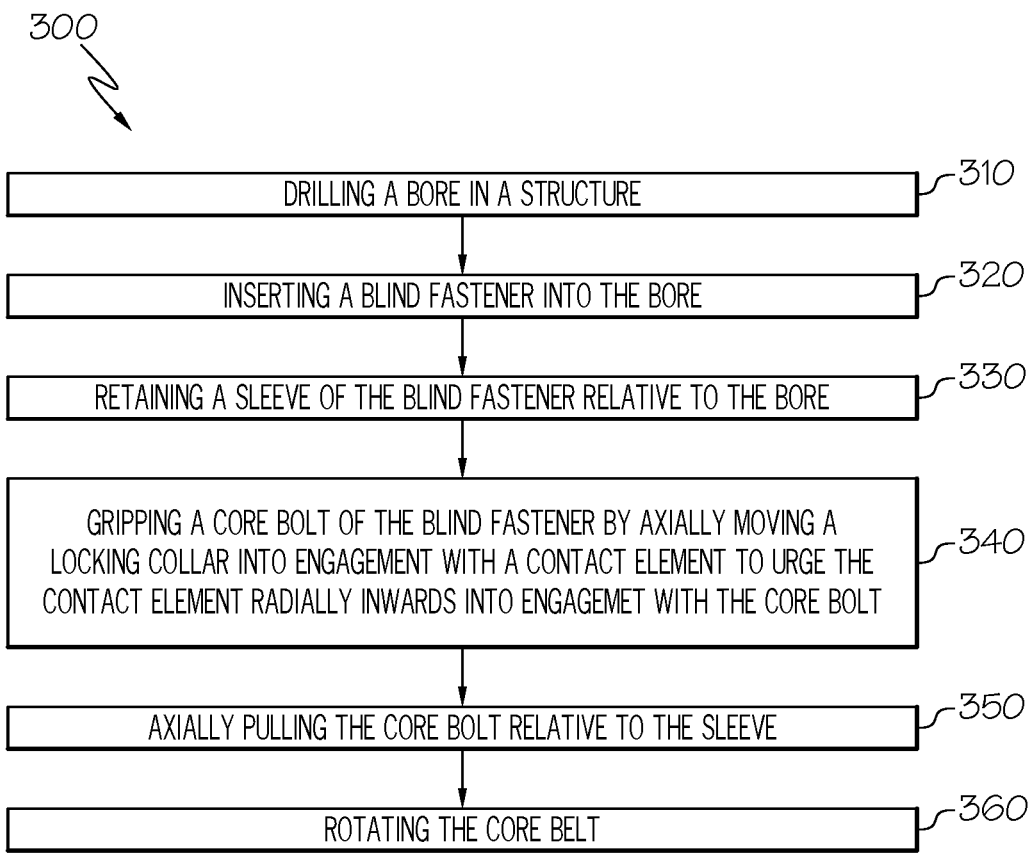
FIG. 18 is a flow diagram of a method for installing a blind fastener.

Referring to FIGS. 14 and 15, in an alternative example, the torqueing element 70 may include a socket member 72 that defines a socket cavity 74 and a socket member axis C that is aligned with the longitudinal axis A. The socket cavity 74 may be sized and shaped to closely receive a portion of a core bolt 14 such that rotation of the socket member 72 about the socket member axis C causes a corresponding rotation of the core bolt 14 about the longitudinal axis A. For example, the core bolt 14 may include a hex-shaped driving provision 16' that corresponds with a similarly hex-shaped socket cavity 74 (FIGS. 16 and 17). Those skilled in the art will appreciate, however, that any variety of suitable driving provision and/or socket cavity shapes (including combinations thereof) may be employed without departing from the scope of the present disclosure.

Those skilled in the art will appreciate that the material composition of the tool 100, including the retention member 20, the gripping member 30, the contact element(s) 50, the locking collar 60, the tool sleeve 80 and the tool housing 82, may largely depend on the conditions and requirements related to the use of the tool 100. It is generally contemplated, however, that the retention member 20, the gripping member 30, the contact element(s) 50 and the locking collar 60 may be fabricated from a material that is sufficiently rigid to mechanically deform metallic blind fasteners 10, such as, for example, steel, titanium, alloys thereof and the like. In contrast, the tool sleeve 80 and the housing 82, due to being relatively external to the core functions of the tool 100 (e.g., the gripping, translating and rotating), may conceivably be fabricated from less rigid materials.

The present disclosure provides another example of a tool 200 for installing a blind fastener 10, wherein the blind fastener 10 includes a sleeve 12 and a core bolt 14 at least partially received within the sleeve 12. The tool 100 includes a retention member 20 that defines a distal surface 22 and a through-opening 24 that extends through the retention member 20 from the distal surface 22. The tool 100 also includes a gripping member 30 that defines a longitudinal axis A and is moveable relative to the retention member 20 along the longitudinal axis A, the gripping member 30 further defining a receiving cavity 32 that is elongated along the longitudinal axis A, an axial opening 34 into the receiving cavity 32, and a radial opening 36 into the receiving cavity 32 that is axially aligned with the through-opening 24 of the retention member 20 along the longitudinal axis A. The tool 100 further includes a contact element 50 at least partially received in the radial opening 36, a torqueing element 70 rotatable about the longitudinal axis A, and a locking collar 60 moveable relative to the gripping member 30 along the longitudinal axis A between at least a first position 62 and a second position 64. In the first position 62 the locking collar 60 engages the contact element 50 and urges at least a portion of the contact element 50 into the receiving cavity 32. In the second position 64 the locking collar 60 is disengaged from the contact element 50.

The present disclosure provides examples of a method 300 for installing a blind fastener 10 that includes a sleeve 12 and a core bolt 14 at least partially received within the sleeve 12, wherein the core bolt 14 also defines a bolt axis B. The method 300 may be performed on any suitable blind fastener, using any suitable tool. For example, the method 300 may be performed on a blind fastener 10 that includes a drive provision 16, using the tool 100 of the present disclosure.

The method may begin with drilling (block 310) a bore 6 in a structure 8. The bore 6 may be sized and shaped in accordance with the physical dimensions of a blind fastener 10, or an appropriate blind fastener 10 may be selected after the bore 6 has been drilled. The drilling 310 may be performed until the bore 6 extends through the entire structure 8, or through just a part of it. Those skilled in the art will appreciate that any suitable combination of tools and methods may be employed to perform the drilling 310, many of which are well known in the art.

After the bore 6 has been drilled 310, the blind fastener 10 is inserted (block 320) into the bore 6. The insertion 320 may be performed either by hand or automated via robotics, and such that the core bolt 14 aligns with the bore 6. Further, the insertion 320 must be performed such that an interfaceable portion of the blind fastener 10 (e.g., the drive provision 16) is exposed so as to enable a tool to perform the installation of the blind fastener 10. After having been inserted 320, the method then proceeds to block 330, retaining the sleeve 12 relative to the bore 6.

Retaining 330 the sleeve 12 relative to the bore 6 is necessary to mechanically deform the sleeve 12 upon the axial translation of the core bore 14. In one example, the retaining 330 may be performed by positioning an appropriate (in size and shape) retention member 20 against the sleeve 12 and configuring the retention member 20 to resist the force applied to the core bolt 14 to axially translate it. Those skilled in the art will appreciate that other methods and/or devices for retaining 330 the sleeve may be employed without departing from the scope of the present disclosure.

The method 300 also includes gripping (block 340) the core bolt by axially moving a locking collar 60 into engagement with a contact element 50 to urge the contact element 50 radially inward into engagement with the core bolt 14. In one example, the locking collar 60 may be coaxially received over a gripping member 30 that includes a plurality of radial openings 36 with a contact element 50 positioned in each radial opening 36. In this example, the locking collar 60 may urge each contact element 50 radially inwards to contact the core bolt 14 at multiple locations, thus improving the "grip" on the core bolt 14 (as compared to only one contact element 50).

The method 300 further includes axially pulling (block 350) the core bolt 14 relative to the sleeve 12. The axial pulling 350 may be performed, for example, by operatively coupling the gripping member 30 to an actuator (e.g., second actuator 86 shown in FIG. 9) configured to pull the gripping member 30 along the longitudinal axis A, and then actuating the actuator. Further, the magnitude of force applied to the core bolt 14 to axially pull it may largely depend on the compressive force required to buckle the sleeve 12 against a structure 8, which, without being bound by any particular theory, may largely depend on the material composition and the physical dimensions of the sleeve 12. Relatively large sleeves 12 fabricated from relatively rigid materials (e.g., titanium, aluminum and the like) may require a greater pulling force than smaller, more compliant sleeves 12.

The method 300 may also include rotating (block 360) the core bolt 14 about the bolt axis B after the axial pulling 350. The rotating 360 may be performed to drive the core bolt 14 into the sleeve 12 and thus, tightening the blind fastener 10 and completing the installation. In one example, the rotating 360 may be performed by operatively coupling the gripping member 30 to an actuator (e.g., third actuator 88 shown in FIG. 9) configured to rotate the gripping member 30 about the longitudinal axis A, and then actuating the actuator. At this point, those skilled in the art will appreciate that the rotational force required to perform the rotating 360, and the number of rotations required, depends on the design of the blind fastener 10 to be installed and thus, may vary without departing from the scope of the present disclosure.

Figure 19:
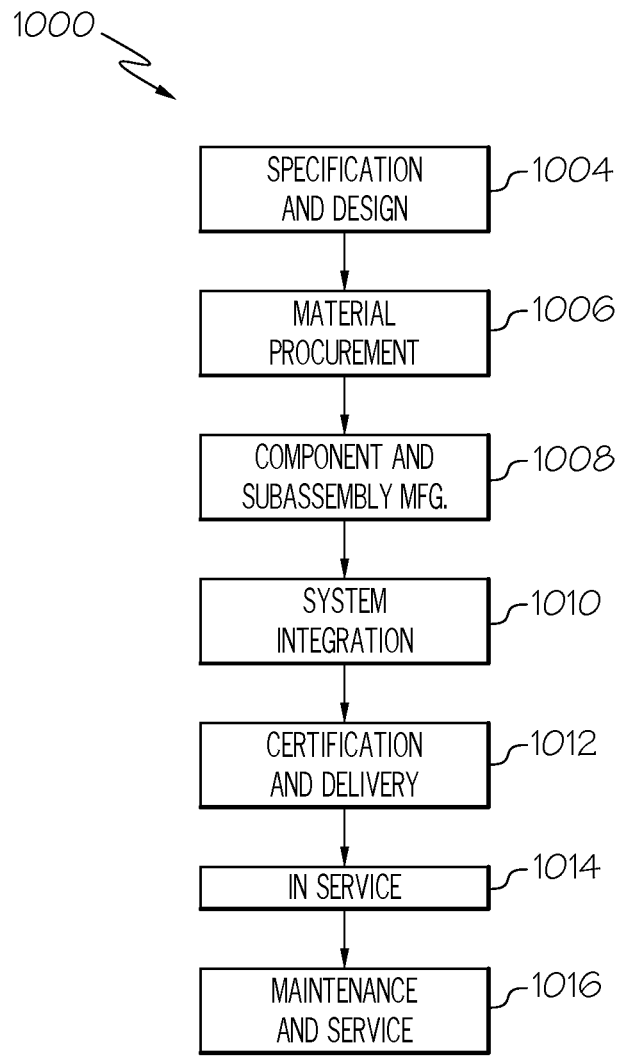
FIG. 19 is a flow diagram of an aircraft manufacturing and service methodology.
Figure 20:
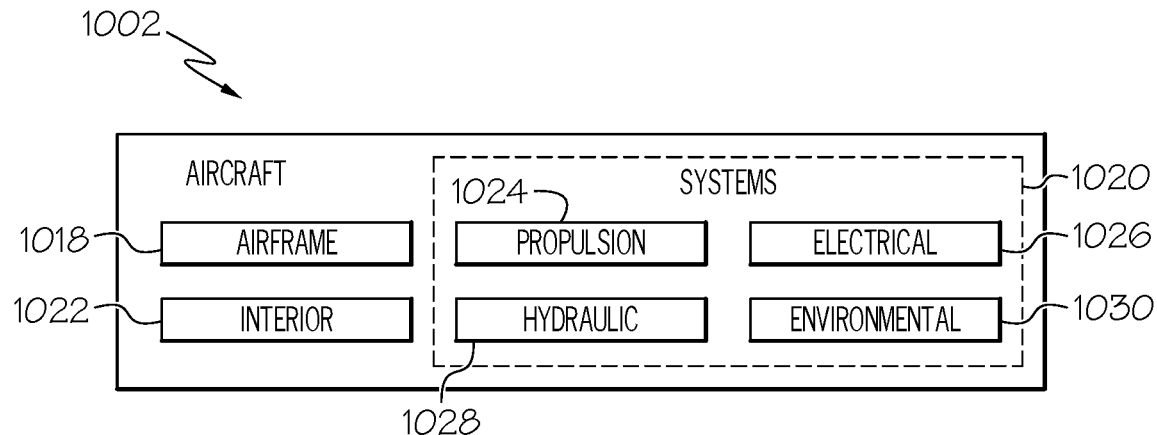
FIG. 20 is a block diagram of an aircraft.

Examples of the disclosure may be described in the context of an aircraft manufacturing and service method 1000, as shown in FIG. 19, and an aircraft 1002, as shown in FIG. 20. During pre-production, the aircraft manufacturing and service method 1000 may include specification and design 1004 of the aircraft 1002 and material procurement 1006. During production, component/subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016, which may also include modification, reconfiguration, refurbishment and the like.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 20, the aircraft 1002 produced by example method 1000 may include an airframe 1018 with a plurality of systems 1020 and an interior 1022. Examples of the plurality of systems 1020 may include one or more of a propulsion system 1024, an electrical system 1026, a hydraulic system 1028, and an environmental system 1030. Any number of other systems may be included.

The disclosed tool and associated method for installing a blind fastener may be employed during any one or more of the stages of the aircraft manufacturing and service method 1000. As one example, the disclosed tool and associated method for installing a blind fastener may be employed during material procurement 1006. As another example, components or subassemblies corresponding to component/subassembly manufacturing 1008, system integration 1010, and or maintenance and service 1016 may be fabricated or manufactured using the disclosed tool and associated method for installing a blind fastener. As another example, the airframe 1018 and the interior 1022 may be constructed using the disclosed tool and associated method for installing a blind fastener. Also, one or more apparatus examples, method examples, or a combination thereof may be utilized during component/subassembly manufacturing 1008 and/or system integration 1010, for example, by substantially expediting assembly of or reducing the cost of an aircraft 1002, such as the airframe 1018 and/or the interior 1022. Similarly, one or more of system examples, method examples, or a combination thereof may be utilized while the aircraft 1002 is in service, for example and without limitation, to maintenance and service 1016.

The disclosed tool and associated method for installing a blind fastener are described in the context of an aircraft; however, one of ordinary skill in the art will readily recognize that the disclosed tool and associated method for installing a blind fastener may be utilized for a variety of applications. For example, the disclosed tool and associated method for installing a blind fastener may be implemented in various types of vehicles including, e.g., helicopters, passenger ships, automobiles and the like.

Although various examples of the disclosed tools and associated methods for installing a blind fastener have been shown and described, modifications may occur to those skilled in the art upon reading the specification. The present application includes such modifications and is limited only by the scope of the claims.

What is claimed is:

1. A tool for installing a blind fastener comprising a sleeve and a core bolt at least partially received within said sleeve, said tool comprising:
   a retention member;
   a gripping member that defines a longitudinal axis and is moveable relative to said retention member along said longitudinal axis, said gripping member further defining a receiving cavity that is elongated along said longitudinal axis, an axial opening into said receiving cavity, and a radial opening into said receiving cavity;
   a contact element at least partially received in said radial opening, the contact element comprising one of a spherical shape, a shape having two opposed hemispheres, and a polyhedral shape, the contact element being movable relative to the gripping member in a direction transverse to the longitudinal axis defined by the gripping member; and
   a locking collar moveable relative to said gripping member along said longitudinal axis between at least a first position and a second position, wherein in said first position said locking collar engages said contact element and urges at least a portion of said contact element into said receiving cavity, and wherein in said second position said locking collar is disengaged from said contact element.

2. The tool of claim 1 wherein said retention member defines a distal surface and a through-opening that extends through said retention member from said distal surface.

3. The tool of claim 2 wherein said through-opening of said retention member is axially aligned with said receiving cavity of said gripping member.

4. The tool of claim 2 wherein when said core bolt of said blind fastener is inserted through said through-opening, said sleeve of said blind fastener abuts said distal surface of said retention member.

5. The tool of claim 1 wherein said gripping member comprises a shaft extending along said longitudinal axis, said shaft comprising a distal end portion and a proximal end portion axially opposed from said distal end portion, wherein said distal end portion comprises said receiving cavity, said axial opening and said radial opening.

6. The tool of claim 1 wherein:
   said radial opening of said gripping member comprises a radial opening depth;
   said contact element comprises a radial thickness; and
   said radial thickness of said contact element is greater than said radial opening depth.

7. The tool of claim 1 wherein said gripping member comprises a plurality of radial openings and said tool comprises a plurality of contact elements, wherein each contact element of said plurality of contact elements is received within a corresponding radial opening of said plurality of radial openings.

8. The tool of claim 7 wherein said plurality of contact elements are aligned in a single plane, wherein said single plane is generally perpendicular to said longitudinal axis.

9. The tool of claim 7 wherein said gripping member defines a circumference, and wherein each radial opening of said plurality of radial openings is equidistantly spaced about said circumference.

10. The tool of claim 1 wherein said contact element is substantially spherical in shape.

11. The tool of claim 1 further comprising a torqueing element rotatable about said longitudinal axis.

12. The tool of claim 11 wherein said torqueing element comprises a socket member that defines a socket cavity, wherein said socket member further defines a socket member axis that is aligned with said longitudinal axis, and wherein said socket cavity is sized and shaped to closely receive a portion of said core bolt such that rotation of said socket member about said socket member axis causes a corresponding rotation of said core bolt about said longitudinal axis.

13. The tool of claim 11 wherein said torqueing element comprises a secondary contact element axially displaced from said contact element along said longitudinal axis.

14. The tool of claim 13 wherein said locking collar urges said secondary contact element radially inward into said receiving cavity when said locking collar is in said first position.

15. The tool of claim 1 further comprising said blind fastener, wherein said core bolt of said blind fastener comprises a driving provision that is interfaceable with said tool.

16. The tool of claim 1 further comprising a tool sleeve coaxially received over said gripping member and fixedly connected to said retention member.

17. The tool of claim 1 further comprising a first actuator operatively connected to said gripping member and configured to axially move said gripping member along said longitudinal axis.

18. The tool of claim 1 further comprising a second actuator operatively connected to said locking collar and configured to axially move said locking collar along said longitudinal axis.

19. The tool of claim 1 wherein said contact element comprises steel or a titanium alloy.

20. A tool for installing a blind fastener comprising a sleeve and a core bolt at least partially received within said sleeve, said tool comprising:
- a retention member that defines a distal surface and a through-opening that extends through said retention member from said distal surface;
- a gripping member that defines a longitudinal axis and is moveable relative to said retention member along said longitudinal axis, said gripping member further defining a receiving cavity that is elongated along said longitudinal axis, an axial opening into said receiving cavity, and a radial opening into said receiving cavity that is axially aligned with said through-opening of said retention member along said longitudinal axis;
- a contact element at least partially received in said radial opening, the contact element comprising one of a spherical shape, a shape having two opposed hemispheres, and a polyhedral shape, the contact element being movable relative to the gripping member in a direction transverse to the longitudinal axis defined by the gripping member;
- a torqueing element rotatable about said longitudinal axis; and
- a locking collar moveable relative to said gripping member along said longitudinal axis between at least a first position and a second position, wherein in said first position said locking collar engages said contact element and urges at least a portion of said contact element into said receiving cavity, and wherein in said second position said locking collar is disengaged from said contact element.

* * * * *